(12) United States Patent
Takeuchi et al.

(10) Patent No.: US 7,639,318 B2
(45) Date of Patent: Dec. 29, 2009

(54) BACKLIGHT AND LIQUID CRYSTAL DISPLAY USING SAME

(75) Inventors: Hajime Takeuchi, Yokohama (JP); Ryo Sakai, Yokohama (JP); Yasumasa Ooya, Chigasaki (JP); Tsutomu Ishii, Yokohama (JP); Yasuhiro Shirakawa, Yokohama (JP); Yukihiro Takenami, Chuo-ku (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 174 days.

(21) Appl. No.: 11/994,661

(22) PCT Filed: Jul. 4, 2006

(86) PCT No.: PCT/JP2006/313266

§ 371 (c)(1),
(2), (4) Date: Jan. 4, 2008

(87) PCT Pub. No.: WO2007/007582

PCT Pub. Date: Jan. 18, 2007

(65) Prior Publication Data

US 2009/0115936 A1    May 7, 2009

(30) Foreign Application Priority Data

Jul. 8, 2005    (JP)  ............................... 2005-200804

(51) Int. Cl.
   *G02F 1/1335* (2006.01)
(52) U.S. Cl. .......................................... 349/61; 349/66
(58) Field of Classification Search .................. 349/61, 349/66
   See application file for complete search history.

(56) References Cited

FOREIGN PATENT DOCUMENTS

| JP | 11 214752 | 8/1999 |
|----|-----------|--------|
| JP | 2000 82849 | 3/2000 |
| JP | 2003 160785 | 6/2003 |
| JP | 2003 207780 | 7/2003 |
| JP | 2004 165124 | 6/2004 |
| JP | 2005 78802 | 3/2005 |
| JP | 2005-108544 | 4/2005 |
| JP | 2005 115131 | 4/2005 |
| WO | 03 100873 | 12/2003 |

*Primary Examiner*—David Nelms
*Assistant Examiner*—Phu Vu
(74) *Attorney, Agent, or Firm*—Oblon, Spivak, McClelland, Maier & Neustadt, L.L.P.

(57) ABSTRACT

A backlight unit 1 includes a plurality of light emitting devices 2 constituted with, for example, LED lamps, and an optical sheet 4 disposed on light emission surface 2b sides of the light emitting devices 2. The light emission surface sides of the plural light emitting devices are joined to the optical sheet 4 via joining layers 5. The backlight unit 1 satisfies a condition of $n1 \leq n2 \leq n3$, where n1 is a refractive index of the optical sheet 4, n2 is a refractive index of the joining layer 5, and n3 is a refractive index of the light emitting device 2.

20 Claims, 6 Drawing Sheets

BACKLIGHT AND LIQUID CRYSTAL DISPLAY USING SAME

TECHNICAL FIELD

The present invention relates to a backlight unit and a liquid crystal display device using the same.

BACKGROUND ART

A light emitting diode (LED) is a semiconductor element converting electric energy into light such as ultraviolet light and visible light, and has advantages of being long life and highly reliable, and when the LED is used as a light source, the time which exchanges lamps can be saved. An LED lamp in which an LED element is sealed by, for example, transparent resin is widely used in a backlight of a liquid crystal display device used in a display part of mobile communication equipment, PC peripheral equipment, OA equipment, household electric equipment or the like, and is also used in a lighting device such as a signal device, various switches, a lamp for automobile use, and illumination.

A color tone of light emitted from the LED lamp depends not only on an emission wavelength of the LED element, and light in a visible range from blue to red according to an intended use can be obtained by, for example, applying a phosphor on a surface of the LED element or including a phosphor in the transparent resin sealing the LED element. In particular, a white light emitting LED lamp is starting to be used for the backlight unit in the liquid crystal display device of the mobile communication equipment, the PC, or the like (See Reference 1).

When the backlight unit using the LED lamp is applied to the liquid crystal display device, light directivity is adjusted by simultaneously using an optical sheet of various types such as a optical diffusion film, a light guide plate, and a prism film. In other words, on a base substrate having a plurality of LED lamps mounted thereon in a plane state, there is overlaid the optical sheet of various types such as the optical diffusion film, the light guide plate, and the prism film, whereby the light directivity is adjusted. In a case as above, there is used a casing, for example, having engagement portions in a plurality of tiers on an inner wall, and the base substrate having the LED mounted thereon is caught by the engagement portion of a certain tier and the optical sheet is caught by the engagement portion of another tier, whereby both are housed in an overlaid manner in the casing (see Reference 2).

In a conventional backlight unit, a space exists between an optical sheet of various types and a base substrate having an LED lamp mounted thereon, in particular, between the optical sheet and the LED lamp. Since air exists in such a space as a matter of course, there is a problem that light emitted from the LED lamp is scattered by the air in the space, so that the light is not sufficiently transmitted to the optical sheet. This leads to a reduced surface luminance. To cope with the above problem, it is considered to shorten a distance between the optical sheet and the base substrate having the LED lamp mounted thereon to make the optical sheet contact the LED lamp. However, it is difficult as a matter of fact to make the both completely contact each other, and air exists, to no small extent, between the both.

Reference 3 describes a linear lighting device made by disposing a frame member around an LED element mounted on a base substrate in a bare chip state and filling light-transmitting sealing resin into the frame. Reference 4 describes a surface light emitting device in which a layer including at least one of an optical adhesive, an optical elastomer, and an optical gel is disposed between a light emission part and a light incident part of a light guide plate. If an optical material is simply disposed between the light emission part and the light guide plate, there is a possibility that light radiated from the light emission part based on a refractive index or the like of respective parts cannot be sufficiently transmitted to an optical sheet such as a light guide plate.

Further, since a temperature of the LED lamp rises to some extent at a time of light emission, coloring may occur depending on an optical material, reducing a light emission luminance. A light emission efficiency is decreased when the LED lamp reaches a high temperature. Therefore, it is necessary to cool the LED lamp at a time of lighting of the backlight unit, but a sufficient heat release structure has not been adopted so far.

Reference 1: JP-A 2003-160785
Reference 2: JP-A 2003-207780
Reference 3: JP-A 2004-165124
Reference 4: JP-A 2005-078802

DISCLOSURE OF THE INVENTION

An object of the present invention is to provide a backlight unit whose surface luminance is improved by sufficiently transmitting light emitted from a light emitting device such as an LED lamp to an optical sheet, and a liquid crystal display device using such a backlight unit.

A backlight unit according to an aspect of the present invention includes: a plurality of light emitting devices having semiconductor light emitting elements; an optical sheet disposed on light emission surface sides of the plurality of light emitting devices; and joining layers intervening between light emission surfaces of the plurality of light emitting devices and the optical sheet, wherein a condition of $n1 \leq n2 \leq n3$ is satisfied, where n1 is a refractive index of the optical sheet, n2 is a refractive index of the joining layer, and n3 is a refractive index of the light emitting device.

A liquid crystal display device according to another aspect of the present invention includes the backlight unit according to the aspect of the present invention, and a liquid crystal display part disposed on a light emission surface side of the backlight unit.

EXPLANATION OF NUMERALS AND SYMBOLS

1 . . . backlight unit, 2 . . . light emitting device (LED lamp), 2*a* . . . non-light emission surface, 2*b* . . . light emission surface 3 . . . base substrate, 4 . . . optical sheet, 5 . . . joining layer, 14 . . . reflection part, 16 . . . gap part, 17 . . . through hole, 20 . . . liquid crystal display device, 21 . . . liquid crystal panel, 30 . . . peripheral member, 31 . . . silicone resin (joining layer)

BEST MODE FOR CARRYING OUT THE INVENTION

Hereinafter, best mode for carrying out the present invention will be described with reference to the drawings. The drawings are provided only for an illustrative purpose and are not intended to limit the present invention, though the embodiments of the present invention will be described based on the drawings below.

Figure 1:
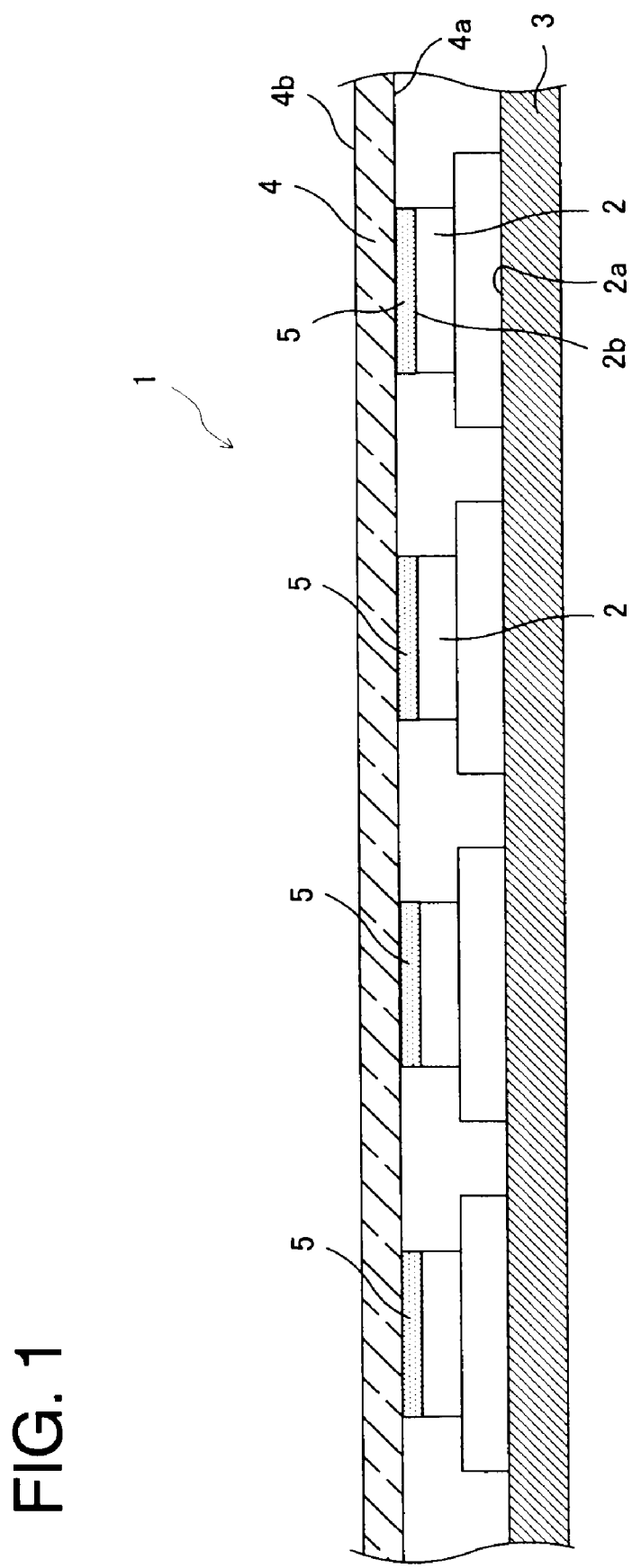
FIG. 1 is a cross-sectional view showing a constitution of a backlight unit according to an embodiment of the present invention.

FIG. 1 is a cross-sectional view showing a constitution of a backlight unit according to an embodiment of the present invention. A backlight unit 1 shown in FIG. 1 includes a plurality of light emitting devices 2, 2 . . . . The light emitting device 2 has a semiconductor light emitting element. As the semiconductor light emitting element, for example, an LED element, a laser diode or the like is used. The light emitting device 2 is a device directly taking out light emitted from the semiconductor light emitting element, or a device taking out the light after an emission color is converted by a phosphor. As the light emitting device 2, employment of an LED lamp (also referred to as an LED chip) using an LED element, in particular, of a white light emitting LED lamp is preferable. In this embodiment, the LED lamp is employed as the light emitting device 2.

Figure 5:
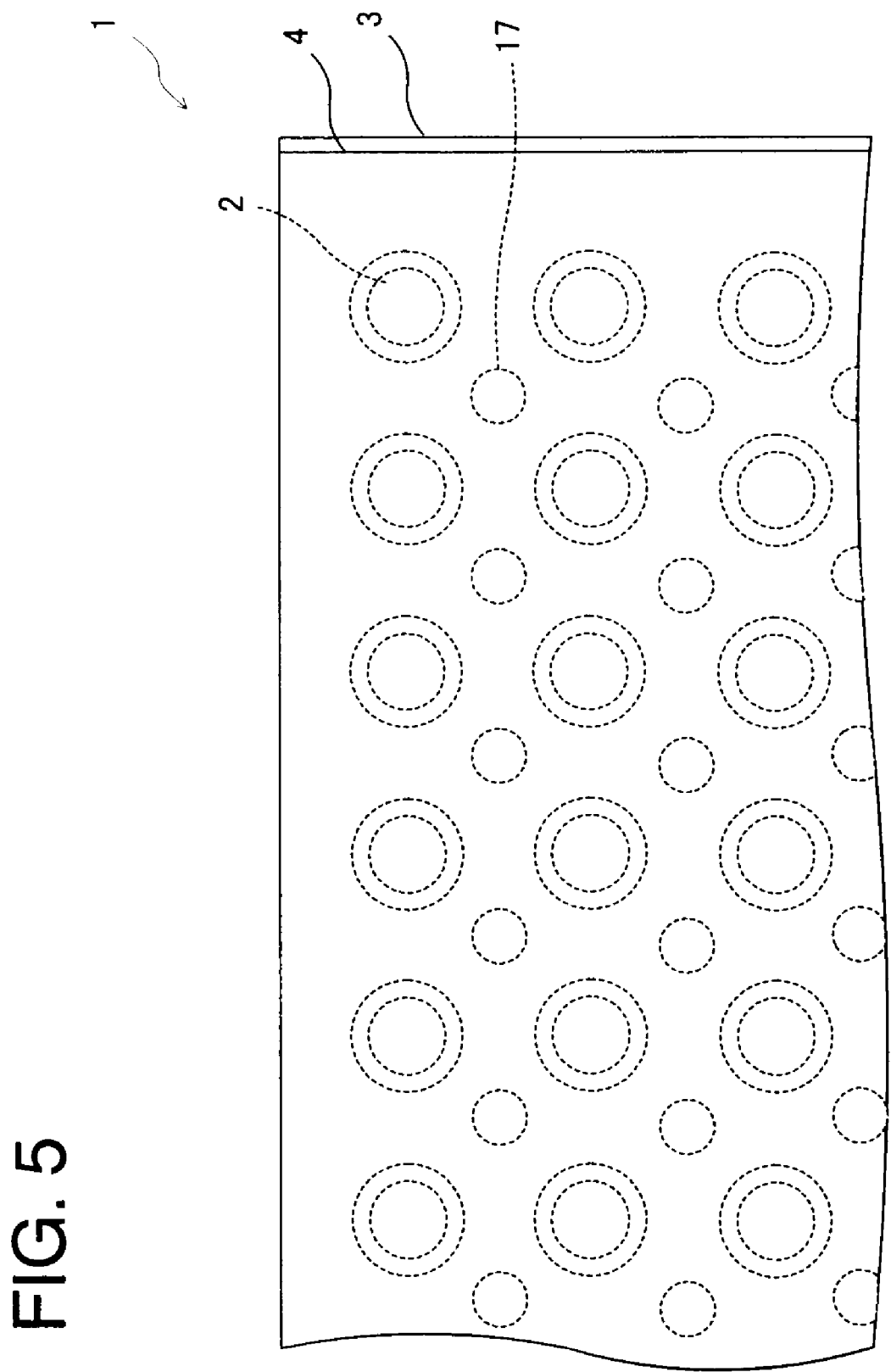
FIG. 5 is a plan view showing a disposition example of a through hole provided in a base substrate.

The plural LED lamps 2 are disposed on a base substrate 3, for example, in matrix (for example, in a disposition shown in FIG. 5). The backlight unit 1 in which the plural LED lamps 2 are disposed in matrix is disposed, for example, directly under a display part of a liquid crystal display device. The backlight unit 1 of this embodiment is suitable for a direct-type backlight unit applicable also to a large screen. It is easy to make the direct-type backlight unit 1 highly luminant since it is possible to increase the number of the LED lamps 2, compared with a side-light type backlight unit in which LED lamps are arranged linearly along an edge of a light guide plate.

A wiring pattern to supply an electric power to each LED lamp 2 is formed on the base substrate 3. The LED lamp 2 is electrically connected to the wiring pattern on the base substrate 3. Each LED lamp 2 is joined in a manner that a non-light emission surface 2*a* thereof is on a base substrate 3 side. An optical sheet 4 is disposed on a light emission surface 2*b* side of the LED lamp 2. A joining layer 5, which tightly joins the LED lamp 2 and the optical sheet 4, intervenes between the LED lamp 2 and the optical sheet 4.

It should be noted that a cylindrical shaped or cup-shaped peripheral member may be provided around each LED lamp 2 on the base substrate 3 in a manner to surround each light emitting device 2, in view of adjusting a space between the base substrate 3 and the optical sheet 4, of restricting detachment of the LED lamp 2 and so on, though not shown in FIG. 1.

In the backlight unit 1 of this embodiment, the light emission surface 2*b* of the LED lamp 2 is joined to the optical sheet 4 via the joining layer 5. Thereby, light radiated from each LED lamp 2 can be effectively transmitted to the optical sheet 4. In other words, by making a gap (air layer) not exist between the light emission surface 2*b* of the LED lamp 2 and the optical sheet 4, scattering of the light from the LED lamp 2 in the air layer before the light is transmitted to the optical sheet 4 is restricted. Accordingly, it becomes possible to effectively transmit light to the optical sheet 4.

Figure 2:
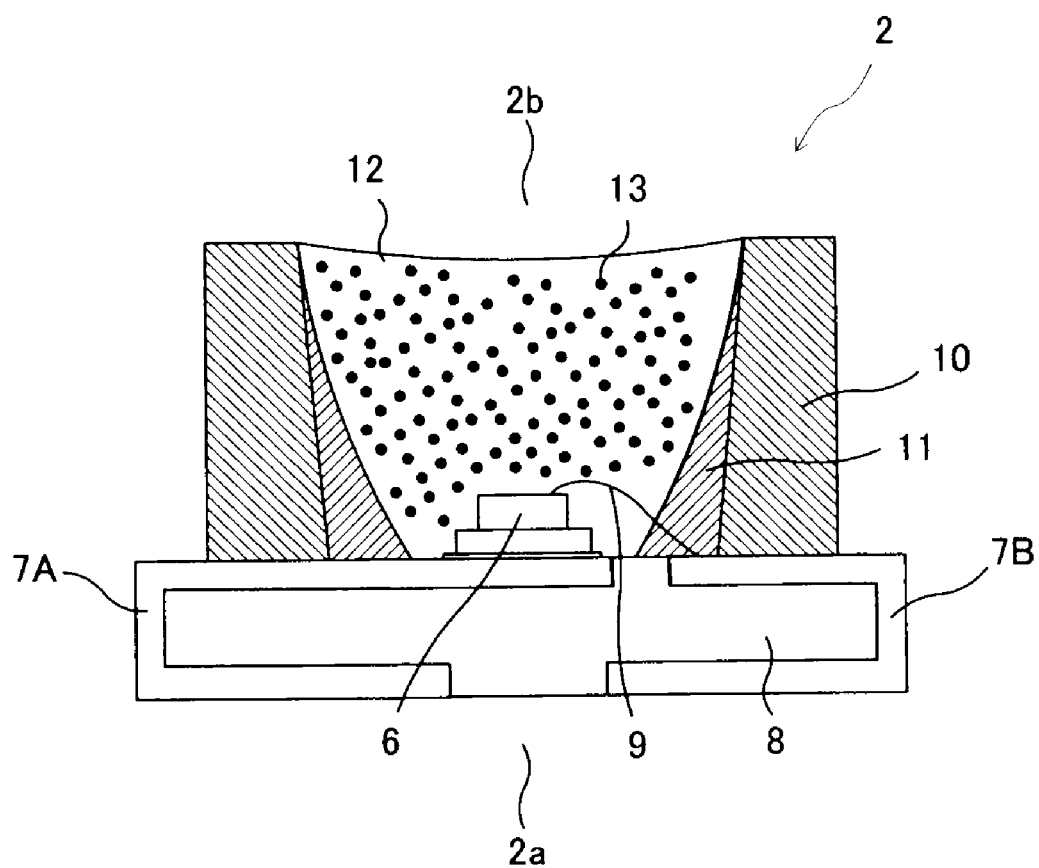
FIG. 2 is a cross-sectional view showing a constitutional example of a light emitting device used for the backlight unit shown in FIG. 1.

The LED lamp 2 used as the light emitting device is preferable to be a white light emitting LED lamp. As the white light emitting LED lamp, there is known an LED lamp made by combining a blue light emitting LED element and a yellow light emitting phosphor (YAG or the like), or an LED lamp made by combining an ultraviolet light emitting LED element and a mixture of blue, green and red phosphors (three color phosphor). In particular, the latter of these, that it, the white light emitting LED lamp made by combining the ultraviolet light emitting LED element and the three color phosphor is preferable. FIG. 2 shows a constitutional example of a white light emitting LED lamp 2 made by combining an ultraviolet light emitting LED and a three color phosphor.

An LED element 6 as a light source is an ultraviolet light emitting LED emitting ultraviolet light or purple light in a wavelength range of, for example, 360 nm to 440 nm. As such an ultraviolet light emitting LED, for example, one having a nitride compound semiconductor layer as a light emitting layer can be cited. The LED element 6 is joined to a wiring board 8 having a pair of lead terminals 7A, 7B. A lower electrode of the LED element 6 is electrically and mechanically connected to the lead terminal 7A. An upper electrode of the LED element 6 is electrically connected to the lead terminal 7B via a bonding wire 9.

A holding member 10 is provided on the wiring board 8. The LED element 6 is disposed inside the holding member 10. As the holding member 10, a cylindrical shaped or cup-shaped holding member made of resin, for example, is used. A reflection layer 11 is formed on an inner wall of the holding member 10. The reflection layer 11 is filled with transparent resin 12, and the LED element 6 is in a state of being buried in the transparent resin 12. The transparent resin 12 contains a phosphor (three color phosphor) 13 having a blue light emitting phosphor, a green light emitting phosphor and a red light emitting phosphor. The three color phosphor 13 emits white light by being excited by ultraviolet light or purple light emitted from the LED element 6.

The transparent resin 12 containing the three color phosphor 13 is exemplified by, for example, silicone resin, epoxy resin and the like, and, in particular, the silicone resin is preferably used. Well-known phosphors emitting blue, green and red colors are used as the respective blue, green and red phosphors constituting the three color phosphor 13, and preferably used is a phosphor effectively absorbing the ultraviolet light or the purple light in the wavelength range of 360 nm to 440 nm radiated from the LED element 6. The transparent resin 12 containing the three color phosphor 13 functions as a light emitting part emitting white light.

As the blue light emitting phosphor, there is used an Eu-activated halophosphate phosphor, an Eu-activated aluminate phosphor or the like, which is superior in absorption efficiency of ultraviolet light or purple light. As the green light emitting phosphor, there is used a Cu- and Al-activated zinc sulfide phosphor, Eu- and Mn-activated aluminate phosphor or the like. As the red light emitting phosphor, there is used an Eu-activated yttrium oxysulfide phosphor, Eu- and Sm-activated lanthanum oxysulfide phosphor, a Cu- and Mn-activated zinc sulfide phosphor or the like. These phosphors are preferable to be appropriately chosen and used in consideration of a color rendering property, uniformity of light emission, luminance characteristics and the like.

It should be noted that a wiring board 8 side of the LED lamp 2 shown in FIG. 2 is the non-light emission surface 2a, the side to be joined to the base substrate 3. On the other hand, a side on which the transparent resin 12 containing the three color phosphor 13 is provided is the light emission surface 2b, a side to be joined to the optical sheet 4 via the joining layer 5.

An optical sheet generally used for the above type of backlight unit 1 suffices for the optical sheet 4, and there can be cited, for example, a optical diffusion film, a light guide plate, a prism film or the like. The optical sheet 4 may be a resin film or the like which simply transmits light. The optical sheet 4 is preferable to be one type chosen from the optical diffusion film, the light guide plate and the prism film. The optical sheet 4 may be made by stacking the above. As the optical sheet 4, a sheet made of, for example, a polyethylene terephthalate (PET) film can be used.

It is preferable to apply transparent resin, in particular, transparent resin having a thermosetting property to the joining layer 5. As transparent resin applied to the joining layer 5, for example, silicone resin, acrylic resin and epoxy resin can be cited. It is preferable to constitute the joining layer 5 with the thermally stable silicone resin among the above, in order to restrict, in particular, coloring caused by temperature rise at a lighting time of the LED lamp 2, and decrease in light emission efficiency due thereto.

The joining layer 5 is preferable to be thermally stable in addition to being transparent. A temperature of the joining layer 5 rises to some extent at the lighting time of the LED lamp 2. Thus, it is desirable to form the joining layer 5 with a material hard to be discolored by heat. Since the silicone resin is thermally stable while the epoxy resin is easy to be discolored by heat, the joining layer 5 is preferable to be formed of the silicone rein. The silicone resin has a transmittance of almost 100% for an ultraviolet region of a wavelength of 400 nm to an infrared region of a wavelength of 800 nm and is a preferable material also in terms of transmittance.

It suffices for the joining layer 5 to be provided in at least part of the light emission surface 2b of the LED lamp 2. However, from a viewpoint of efficient and appropriate transmission of the light emitted from the LED lamp 2 to the optical sheet 4, the joining layer 5 is preferable to be provided on an entire light emission surface 2b of the LED lamp 2. Further, when the peripheral member is provided in a manner to surround the LED lamp 2, it is preferable to provide the joining layer 5 also inside the peripheral member and on a front surface part of the optical sheet 4 side.

A thickness of the joining layer 5 is not necessarily limited, but if the thickness of the joining layer 5 is too thin, it becomes difficult to surely join the light emission surface 2b of the LED lamp 2 and the optical sheet 4. On the other hand, if the thickness of the joining layer 5 is too thick, there is a possibility that loss of light due to the joining layer 5 becomes large. In view of the above points, the thickness of the joining layer 5 is preferable to be 0.1 mm or less and 3 mm or more. For example, in a case of the above-described transparent resin such as the silicone resin and the acrylic resin, the loss of light can be restricted even if the thickness of the joining layer is about 3 mm.

In the backlight unit 1 of this embodiment, it is preferable that a condition of $n1 \leqq n2 \leqq n3$ is satisfied with a refractive index of the optical sheet 4 being n1, a refractive index of the joining layer 5 being n2, and a refractive index of the LED lamp 2 being n3. As a result that the respective refractive indexes of the optical sheet 4, the joining layer 5, and the LED lamp 2 of the backlight unit 1 satisfy the condition of $n1 \leqq n2 \leqq n3$, total reflection in joining interfaces of respective parts can be restricted. Therefore, it becomes possible to effectively transmit the light from the LED lamp 2 to the joining layer 5, and further from the joining layer 5 to the optical sheet 4.

As for concrete refractive indexes of respective parts, it is preferable, for example, that the refractive index n1 of the optical sheet 4 is 1.3 or less, the refractive index n2 of the joining layer 5 is 1.4 or less, and the refractive index n3 of the LED lamp 2 is 2.48 or less. The relation of $n1 \leqq n2 \leqq n3$ is preferable to be satisfied on the basis described above. It should be noted that the refractive index n3 of the LED lamp 2 indicates a refractive index of the LED element 6. In order to satisfy such a refractive index, the joining layer 5 is preferable to be constituted with the silicone resin, the acrylic resin or the like, if, for example, the optical sheet 4 is constituted with the polyethylene terephthalate film. It should be noted that the refractive index of each part is measured by a minimum deviation method.

Figure 3:
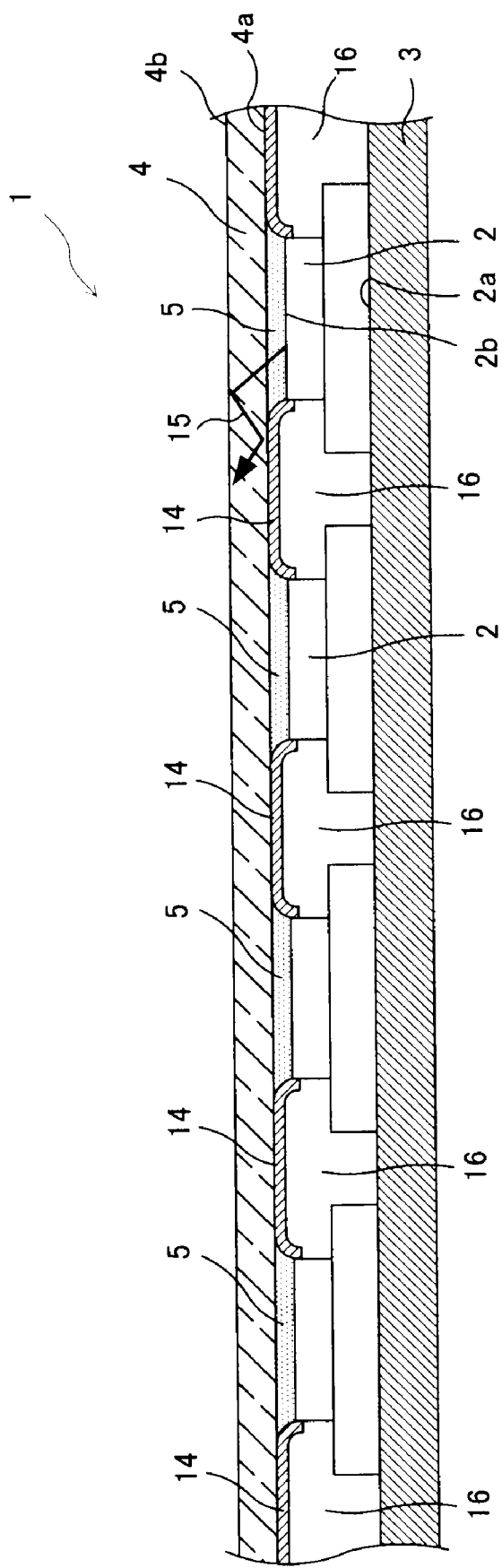
FIG. 3 is a cross-sectional view showing a modification example of the backlight unit shown in FIG. 1.

In the backlight unit 1 of this embodiment, it is preferable, for example, as shown in FIG. 3, that a reflection part 14 is provided in a portion (LED non-joining part) except a portion to which the LED lamp 2 is joined, in an optical sheet 4 surface (LED joining surface 4a) to which the LED lamp 2 is joined. In the backlight unit 1, since the light emission surface 2b of each LED lamp 2 and the optical sheet 4 are joined via the joining layer 5 as described above, the light emitted from each LED lamp 2 can be effectively transmitted to the optical sheet 4.

However, as shown by an arrow 15 in FIG. 3, for example, not all of the light transmitted from the LED lamp 2 to the optical sheet 4 is discharged from the LED non-joining surface 4b, but part thereof is reflected on the LED non-joining surface 4b and returns to the LED joining surface 4a. On this occasion, if nothing has been formed in the LED non-joining part of the LED joining surface 4a, light is discharged from the LED non-joining part in an unnecessary direction, so that a surface luminance of the backlight unit 1 is decreased.

Thus, it is preferable to join the light emission surface 2b of the LED lamp and the optical sheet 4 via the joining layer 5 and to provide the reflective part 14 in the LED non-joining part in the LED joining surface 4a of the optical sheet 4. Thereby, discharge of the light from the LED non-joining part in the unnecessary direction is restricted, so that the surface luminance of the backlight unit 1 can be further improved. The reflection part 14 is preferable to be formed in a portion equal to or more than 80% of the LED non-joining part in the LED joining surface 4a of the optical sheet 4, with the LED non-joining part in the LED joining surface 4a of the optical sheet 4 being 100%, and further, it is further preferable that the reflective part 14 is formed on an entire surface of the LED non-joining part.

As the reflection part 14, for example, a film body containing a white particle can be cited. For example, an alumina ($Al_2O_3$) particle, a titania ($TiO_2$) particle or the like is suitable as the white particle. The white particle as above is preferable to be a fine particle with an average particle size of equal to or smaller than 20 μm, in view of obtaining a uniform film when the particle is applied to form the reflection part 14. The reflection part 14 can be obtained by applying a slurry containing such a white particle. The reflection part 14 may be a film formed of alumina, titania or the like by means of a film forming method such as a vapor deposition method or a spattering method.

A thickness of the reflection part 14 is preferable to be 10 µm or more. If the thickness of the reflection part 14 is less than 10 µm, for example, a content of the white particle is low, so that sometimes a sufficient reflectance cannot be obtained. In view of the reflectance, the thickness of the reflection part 14 is preferable to be thick, but if the reflection part 14 is made excessively thick, a gap part 16 being a space between the base substrate 3 and the optical sheet 4 is small in cross-sectional area. This means that a space in which air to cool the heated LED lamp 2 flows is small. Therefore, the thickness of the reflection part 14 is preferable to be 100 µm or less.

The reflectance of the reflection part 14 is preferable to be 80% or more. If the reflectance of the reflection part is equal to or higher than 80%, returned light having been reflected by the LED non-joining surface 4b of the optical sheet 4 can be well reflected by the reflection part 14 of the LED joining surface 4a, and can be effectively returned to the LED non-joining surface 4b. It should be noted that measurement of the reflectance of the reflection part 14 can be performed by measurement of all reflection components (measurement of a regular reflection component and a diffuse reflection component) by using an integrating sphere.

Figure 4:
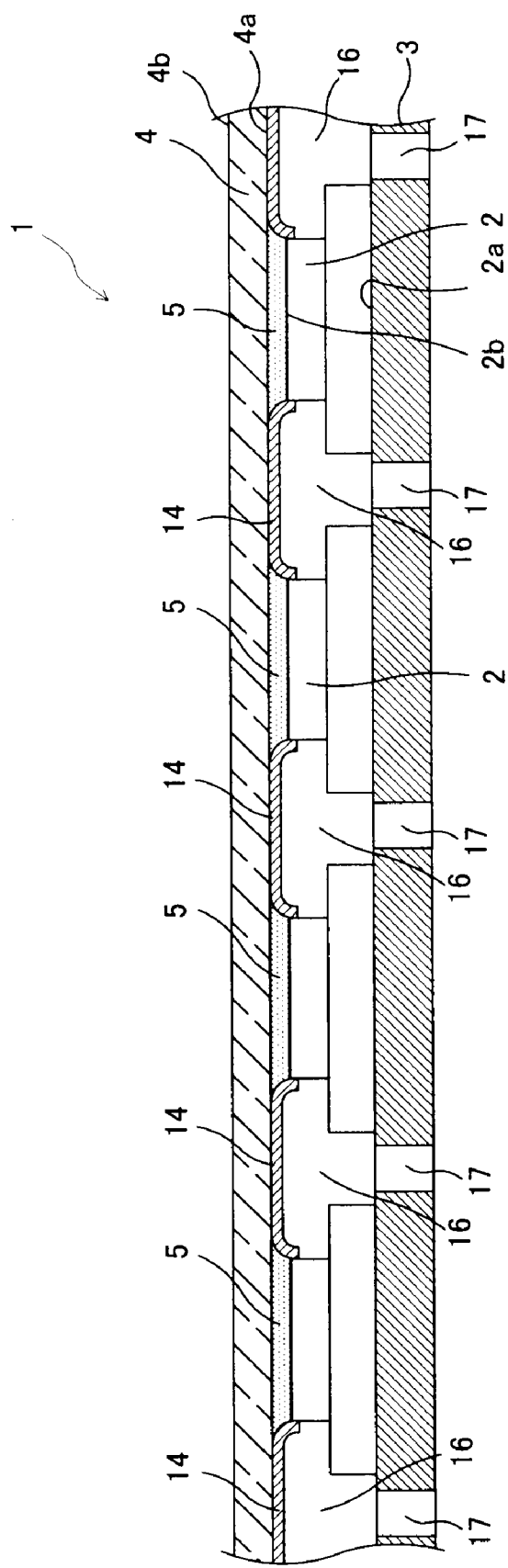
FIG. 4 is a cross-sectional view showing another modification example of the backlight unit shown in FIG. 1.

In the backlight unit 1 of this embodiment, as shown in FIG. 4, for example, it is preferable to use a base substrate 3 having a through hole 17. The through hole 17 is formed to go through one of principal surfaces of the base substrate 3 toward the other principal surface. Employment of such a base substrate 3 having the through hole 17 enables a cooling gas such as air to be led to the gap 16 by using the through hole 17, and the cooling gas is circulated in the continuous gap 9 to cool the LED lamp 2. Further, the cooling gas such as air used for cooling can be discharged out of the gap 16 by using the through hole 17.

A forming position of the through hole 17 is not limited as long as it is in a portion to which the LED lamp 2 is not joined, of the base substrate 3, and the position can be set accordingly. It should be noted that when the reflection part 14 is provided on the optical sheet 4, the reflection part 14 of the optical sheet 4 faces the portion to which the LED lamp 2 is not joined, of the base substrate 3, and therefore, it suffices to form the through hole 17 in the portion facing the reflection part 14, of the base substrate 3.

The through hole 17 is preferable to be formed in the portion surrounded by the plural LED lamps 2 in the portion to which the LED lamp 2 is not joined, of the base substrate 3. FIG. 5 shows a backlight unit 1 employing a base substrate 3 having a through hole 17 formed in a portion surrounded by four LED lamps 2. The LED lamps 2 are disposed on the base substrate 3 in matrix. It should be noted that FIG. 5 is a view of the backlight unit 1 seen from an optical sheet 4 side.

As shown in FIG. 5, forming the through hole 17 in the portion surrounded by four LED lamps 2, of the base substrate 3, enables effective cooling of the LED lamp 2. Further, providing the through hole 17 in every such position enables to enhance cooling efficiency of the LED lamp 2 furthermore. A size or a cross-sectional shape or the like of the through hole 17 is chosen accordingly depending on the number or a heating value of the LED lamp 2 joined to the base substrate 3. As the cross-sectional shape of the through hole 17, for example, a circular shape as shown in FIG. 5 is cited, but a triangular shape, a quadrangular shape or the like can be chosen accordingly in addition to the above.

The backlight unit 1 of the above-described embodiment is fabricated as follows, for example. First, the plural LED lamps 2 are disposed on the base substrate 3, for example, in matrix, and is joined thereto. Each LED lamp 2 is disposed in a manner that the non-light emission surface 2a is on the base substrate 3 side. The base substrate 3 may be a uniform planar substrate or may be a substrate having the through hole 17 formed therein.

On the other hand, the optical diffusion film, the light guide plate, the prism film or the like is prepared as the optical sheet 4. The optical sheet 4 may be a resin film or the like which simply transmits light. If the reflection part 14 is provided in the optical sheet 4, the reflection part 14 is formed in the LED non-joining part in the LED joining surface 4a of the optical sheet 4. Formation of the reflection part 14 is performed by applying a slurry made by adding a white particle such as an alumina particle or a titania particle to a resin binder, for example, or by forming alumina or titania into a film by using a film forming method such as a vapor deposition method or a spattering method.

Next, silicone resin, acrylic resin or the like to be the joining layer 5 is applied or potted on the light emission surface 2b of the LED lamp 2. The silicone resin, the acrylic resin or the like to be used for the formation of the joining layer 5 is preferable to be subjected to a defoaming processing. If foam is included in the silicon resin or the acrylic resin, light is scattered at a foam portion when cured, so that there is a possibility that the surface luminance of the backlight unit 1 is decreased. For the similar reason, it is more preferable to perform a defoaming processing also after application of the silicone resin or the acrylic resin.

The optical sheet 4 is overlaid and stacked on the light emission surface 2b side of the LED lamp 2 on which the silicone resin, the acrylic resin or the like having been applied or potted as above. On this occasion, if the reflection part 14 has been formed on the LED lamp joining surface 4a of the optical sheet 4, the optical sheet 4 is stacked in a manner that the reflection part 14 and the light emission surface 2b of the LED lamp 2 do not overlap each other. Thereafter, the applied or popped silicone resin, the acrylic resin or the like is thermal cured, whereby the light emission surface 2b of the LED lamp 2 and the optical sheet 4 are joined via the joining layer 5. It should be noted that the silicone resin, the acrylic resin or the like to be the joining layer 5 may be applied or potted on the optical sheet 4.

Figure 6:
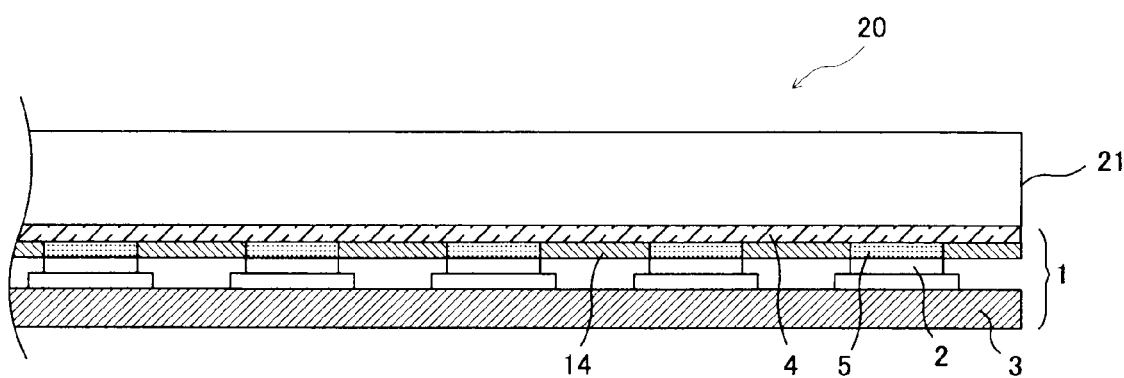
FIG. 6 is a cross-sectional view showing a constitution of a liquid crystal display device according to an embodiment of the present invention.

Next, a liquid crystal display device according to an embodiment of the present invention will be described with reference to FIG. 6. FIG. 6 is a cross-sectional view showing a constitution of a liquid crystal display device 20 according to the embodiment of the present invention. The liquid crystal display device 20 shown in FIG. 6 includes a planer liquid crystal panel 21 as a liquid crystal display part, and a backlight unit 1 lighting the liquid crystal panel 21 from a rear surface side. A concrete constitution of the backlight unit 1 is as described in the embodiment stated above, and the backlight unit 1 has a base substrate 3 having a plurality of LED lamps 2 disposed thereon in matrix.

The backlight unit 1 is disposed in a manner that the optical sheet 4 constituting a light emission surface is on a liquid crystal panel 21 side. The backlight unit 1 having the plural LED lamps 2 disposed thereon in matrix is disposed directly under the liquid crystal panel 21. In other words, the direct-type backlight unit 1 is applied to the liquid crystal display device 20 of this embodiment. As stated above, usage of the direct-type backlight unit 1 enables enhancement of a luminance of the liquid crystal display device 20. Further, since the backlight unit 1 can effectively transmit light radiated from numerous LED lamps 2 to the optical sheet 4, it becomes possible to further improve the luminance of the liquid crystal display device 20.

The liquid crystal panel 21 is made by disposing, for example, between two polarizing plates, an array substrate and a color filter substrate respectively being glass plates having transparent electrodes formed thereon, in a manner to face to each other, and injecting liquid crystal therebetween to constitute a liquid crystal layer. Red (R), green (G), and blue (B) color filters are formed in correspondence with respective pixels on the color filter substrate. Between the liquid crystal panel 21 and the backlight unit 1, there is disposed at least one chosen from a optical diffusion film and a prism film, as an optical sheet 4 of the backlight unit 1 or for another purpose.

Next, concrete examples of the present invention and evaluation results thereof will be described.

Example 1

First, an europium-activated alkaline earth chlorophosphate $((Sr_{0.99}, Eu_{0.01})_{10}(PO_4)_6 \cdot Cl_2)$ phosphor is prepared as a blue light phosphor, an europium- and manganese-activated aluminate $((Ba_{0.726}, Eu_{0.274})(Mg_{0.55}Mn_{0.45})Al_{10}O_{17})$ phosphor is prepared as a green light phosphor, and an europium-activated lanthanum oxysulfide $((La_{0.83}, Sb_{0.002}, Eu_{0.115})_2 O_2S)$ phosphor is prepared as a red light phosphor. Each phosphor powder is mixed at a ratio of 30 mass percent respectively in silicone resin to form a slurry of each color.

Next, the blue light phosphor slurry at a ratio of 20.1 mass percent, the green light phosphor slurry at a ratio of 19.5 mass percent, and the red light phosphor slurry at a ratio of 60.4 mass percent are mixed, and thereafter are applied on an LED element 6 as shown in FIG. 2. Silicone resin containing this three color phosphor is cured by a heat treatment at a temperature of 140° C. to obtain a white light emitting LED lamp. It should be noted that an ultraviolet light emitting LED with an excitation wavelength of 390 nm is used as the LED element.

A plurality of LED lamps obtained as above are disposed and joined to a base substrate in matrix, in a manner that a non-light emission surfaces of the LED lamps are on a base substrate side. Then, after the silicone resin subjected to a defoaming processing is applied on the light emission surface of each LED lamp in a thickness of 2 mm, an optical sheet having no reflection part formed thereon is overlaid and stacked. Thereafter, a heat treatment is performed to cure the silicone resin, whereby a backlight unit is fabricated in which the light emission surface of each LED lamp and the optical sheet are joined with a joining layer. It should be noted that a refractive index n1 of the optical sheet is 1.3, a refractive index n2 of the joining layer is 1.4, and a refractive index n3 of the LED lamp is 2.4, and n1<n2<n3.

Example 2 To Example 7

A slurry made by mixing an alumina particle with a binder is applied on an LED-non joining part in an LED joining surface of an optical sheet similar to that of Example 1 and then dried, so that a reflection part is formed. A reflectance, an area, and a film thickness of the reflection part are as shown in Table 1. Here, the area of the reflection part indicates a value based on an area of an entire LED non-joining part in the LED joining surface of the optical sheet being 100%.

Next, a base substrate having LED lamps joined thereto is prepared similarly to Example 1, and silicone resin subjected to a defoaming processing is applied on a light emission surface of each LED lamp in a thickness of 0.5 to 2.5 mm. An optical sheet having a reflection part formed thereon is stacked on a light emission surface side on which the silicone resin is applied, of the LED lamp, in a manner that an LED joining surface side on which the reflection part is formed is on an LED lamp side, and that a portion on which the reflection part is not formed and the light emission surface of the LED lamp overlap each other. Thereafter, a heat treatment is applied to cure the silicone resin, whereby a backlight unit is respectively fabricated in which the light emission surface of each LED lamp and the optical sheet are joined with the joining layer.

Example 8

A base substrate having LED lamps joined thereto is prepared similarly to Example 1, and epoxy resin subjected to a defoaming processing is applied on a light emission surface of each LED lamp in a thickness of 2 mm. An optical sheet on which a reflection part is not formed is overlaid and stacked on a light emission surface side on which the epoxy resin is applied, of the LED lamp. Thereafter, a heat treatment is applied to cure the epoxy resin, whereby a backlight unit is fabricated in which the light emission surface of each LED lamp and the optical sheet are joined with the joining layer. It should be noted that a refractive index n2 of the joining layer is 1.4, and n1≦n2≦n3.

Comparative Example 1

Similarly to Example 1, there are employed a base substrate having LED lamps joined thereto and an optical sheet having no reflection part formed thereon, and the base substrate and the optical sheet are overlaid in a manner that an interval therebetween is as narrow as possible, whereby a backlight unit is fabricated. In Comparative Example 1, a joining layer is not applied.

Comparative Example 2

A backlight unit is fabricated similarly to Example 1, except that silicone resin for to form a joining layer is not subject to a defoaming processing. It is confirmed by visual observation that foam exists in part of the joining layer. A refractive index n2 of this joining layer is 1.0, and n1>n2<n3.

Next, each backlight unit of Example 1 to Example 8, Comparative Example 1 and Comparative Example 2 is made to emit light and a surface luminance (initial luminance) is measured. Results thereof will be shown in Table 1.

TABLE 1

| | Joining layer | | Reflection part | | | Surface Luminance (Cd/m²) |
|---|---|---|---|---|---|---|
| | Material | Defoaming processing done/not done | Reflectance (%) | Film Thickness (μm) | Area (%) | |
| E1 | Silicone resin | Yes | — | — | — | 15000 |
| E2 | Silicone resin | Yes | 95 | 80 | 60 | 18000 |
| E3 | Silicone resin | Yes | 95 | 80 | 80 | 19000 |
| E4 | Silicone resin | Yes | 95 | 80 | 90 | 19500 |
| E5 | Silicone resin | Yes | 95 | 80 | 100 | 20000 |
| E6 | Silicone resin | Yes | 80 | 20 | 100 | 18500 |
| E7 | Silicone resin | Yes | 90 | 35 | 100 | 19500 |
| E8 | Epoxy resin | Yes | — | — | — | 15000 |
| CE1 | (none) | — | — | — | — | 10000 |
| CE2 | Silicone resin | None | — | — | — | 12000 |

E = Example; CE = Comparative Example

As is apparent from Table 1, by joining the light emission surface of each LED lamp and the optical sheet via the joining surface and making the respective refractive indexes of the optical sheet, the joining layer, and the LED lamp satisfy the condition of n1≦n2≦n3, the surface luminance of the backlight unit can be improved. Further, by forming the reflection part on the optical sheet, and by increasing the reflectance of the reflection part or by increasing the area of the reflection part, the surface luminance of the backlight unit can be further enhanced. In order for the refractive indexes of respective parts of the backlight unit to satisfy the condition of $n1 \leq n2 \leq n3$, application of the defoaming processing to resin used for forming the joining layer is effective.

Next, after each backlight unit of Example 1 and Example 8 is continuously lighted for 4000 hours, a power source is turned off and the backlight unit is cooled for three hours. Thereafter, each backlight unit is lighted again and the luminance is measured. As stated above, irreversible luminance reduction due to relighting is investigated. Results thereof will be shown in Table 2.

TABLE 2

| | Initial Luminance (Cd/m$^2$) | Luminance after Continuous Lighting (Cd/m$^2$) |
|---|---|---|
| Example 1 | 15000 | 12000 |
| Example 8 | 15000 | 10000 |

As is apparent from Table 2, though the initial luminance of each backlight unit is excellent, there is a difference between the luminances after the continuous lighting. Each backlight unit is disassembled, and no change is recognized by visual observation in Example 1, while in Example 8 the joining layer is slightly discolored to yellow. As for other characteristics, no difference is recognized between both members. It is considered that luminance reduction of the backlight unit of Example 8 after the continuous lighting is larger compared with Example 1 because the joining layer made of the epoxy resin is discolored during the continuous lighting.

Example 9, Example 10

Figure 7:
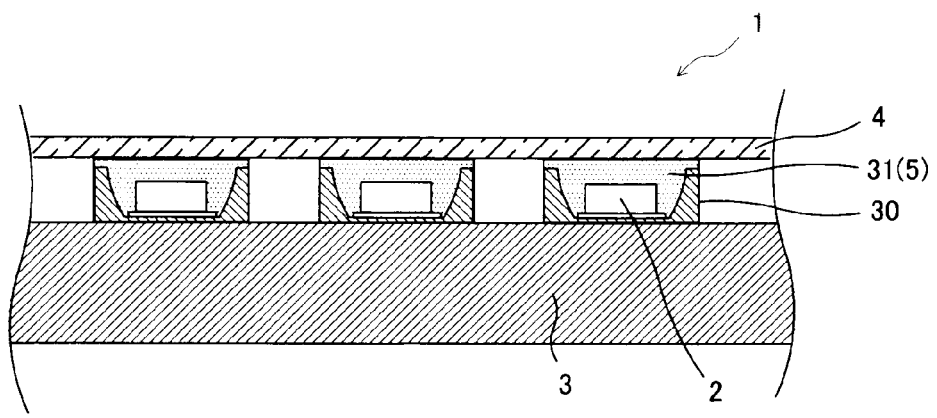
FIG. 7 is a cross-sectional view showing a constitution of a backlight unit according to Example 9 of the present invention.

As shown in FIG. 7, after cups 30 are joined as peripheral members on portions where respective LED lamps 2 are to be joined, of a base substrate 3, the LED lamps 2 are respectively joined to inner bottom portions of these cups 30. Silicone resin 31 subjected to a defoaming processing is filled inside the cup 30 so that the silicone resin 31 is applied on a light emission surface 2b of the LED lamp 2 in a thickness of 1.5 mm, and the silicone resin 31 is applied on an end part (a surface part of a side to which an optical sheet 4 is to be joined) of the cup 30.

After the optical sheet 4 is overlaid and stacked on a side to which the cup 30 is joined, of the base substrate 3, a heat treatment is applied to cure the silicone resin 31, whereby a backlight unit (Example 9) is fabricated in which the light emission surface 2a of each LED lamp 2 and the optical sheet 4 are joined with a joining layer 5. The silicone resin 31 constitutes the joining layer 5. The end part of the cup 30 is also joined to the optical sheet 4 with the joining layer 5. Since part of the silicone resin 31 is filled inside the cup 30, that part produces an anchoring effect. Further, a backlight unit (Example 10) is fabricated similarly to Example 9, except that no cup is provided as a peripheral member. For these backlight units, forces required for detaching the LED lamps are measured. Results thereof will be shown in Table 3.

TABLE 3

| | Forces Required for Detaching LED Chip (gf) |
|---|---|
| Example 9 | 500 |
| Example 10 | 40 |

As is apparent from Table 3, by providing the peripheral member such as the cup around the LED lamp, the force required for detaching the LED lamp can be increased. Therefore, according to a backlight unit with such a structure, it becomes possible to restrain detachment of an LED lamp from an optical sheet and to further enhance reliability.

Example 11, Example 12

With a backlight unit similar to that of Example 9 being used, power distribution of 20 mA is performed for three hours under a room temperature (25° C.), and a temperature of a cup being a peripheral member provided around an LED lamp is measured (Example 11). Further, there is fabricated a backlight unit (Example 12) similar to that of Example 9 except that a base substrate having a through hole is used. Power distribution is performed to this backlight unit under the same condition as that of Example 11, and a temperature of a cup being a peripheral member of an LED lamp is measured. Results thereof will be shown in Table 4.

TABLE 4

| | Cup Temperature (° C.) |
|---|---|
| Example 11 | 70 |
| Example 12 | 45 |

As is apparent from Table 4, usage of the base substrate having the through hole makes it possible that air being a cooling gas flow effectively between an optical sheet and the base substrate, or between LED lamps. Thereby, restriction of excessive heat generation in the LED becomes possible.

Example 13

With a constitution similar to that of Example 9 being applied, a direct-type backlight unit with an outside dimension of 330 mm×190 mm (corresponding to 15 inch wide specification) is fabricated. LED lamps are disposed in matrix of 24 rows and 13 columns. A total number of LED lamps is 312.

Reference Example 1

The same number of LED lamps with the same constitution as that of Example 9 are prepared. On a base substrate of 320 mm in length and 4 mm in width are linearly disposed 156 LED lamps. Two linear light sources as described above are fabricated. These linear light sources are attached on two edges in a longitudinal direction of a light guide plate, so that a side-light type backlight unit (corresponding to 15 inch wide specification) is fabricated.

Next, in the direct-type backlight unit of Example 13 and the side-light type backlight unit of Reference Example 1, power distribution of 20 mA is performed respectively under a room temperature (25° C.) to light the backlight unit for three hours. An initial luminance, a luminance after three hour lighting, and a cup temperature are measured for each backlight unit. The cup temperature is measured similarly to Example 11. Results thereof will be shown in Table 5.

TABLE 5

|  | Initial Luminance (Cd/m²) | Luminance after Three Hour Lighting (Cd/m²) | Cup Temperature after Three Hour Lighting (° C.) |
| --- | --- | --- | --- |
| Example 13 | 15000 | 13000 | 70 |
| Reference Example 1 | 14000 | 6500 | 146 |

As is apparent from Table 5, in the side-light type backlight unit compliant with a large screen, a temperature of the LED lamp rises significantly since it is necessary to dispose numerous LED lamps in a small area. As a result, the luminance is decreased significantly even by short-time lighting.

INDUSTRIAL APPLICABILITY

According to a backlight unit according to an embodiment of the present invention, light from a light emitting device such as an LED lamp can be effectively transmitted to an optical sheet without being scattered, so that enhancement of a surface luminance becomes possible. Such a backlight unit is useful for a liquid crystal display device. Further, according to a liquid crystal display device using the backlight unit according to the embodiment of the present invention, a display quality and a display characteristic can be enhanced.

What is claimed is:

1. A backlight unit, comprising:
a plurality of light emitting devices having semiconductor light emitting elements;
an optical sheet disposed on light emission surface sides of the plurality of light emitting devices; and
joining layers intervening between light emission surfaces of the plurality of light emitting devices and the optical sheet,
wherein a condition of $n1 \leq n2 \leq n3$ is satisfied, where n1 is a refractive index of the optical sheet, n2 is a refractive index of the joining layer, and n3 is a refractive index of the light emitting device.

2. The backlight unit according to claim 1,
wherein the refractive index n1 of the optical sheet is 1.3 or less, the refractive index n2 of the joining layer is 1.4 or less, and the refractive index n3 of the light emitting device is 2.48 or less.

3. The backlight unit according to claim 1, further comprising
a base substrate to which non-light emission surfaces of the plurality of light emitting devices are joined.

4. The backlight unit according to claim 3,
wherein the plurality of light emitting devices are disposed on the base substrate in matrix; and
wherein the base substrate is disposed directly under a display device radiating light emitted from the plurality of light emitting devices.

5. The backlight unit according to claim 1,
wherein the joining layer is made of transparent resin having a thermosetting property.

6. The backlight unit according to claim 5,
wherein the transparent resin is silicone resin.

7. The backlight unit according to claim 1,
wherein the optical sheet has a reflection part provided on a non-joining part for the light emitting device in a surface to which the plurality of light emitting devices are joined.

8. The backlight unit according to claim 7,
wherein the reflection part is provided in 80% or more of the non-joining part for the light emitting device of the optical sheet.

9. The backlight unit according to claim 7,
wherein the reflection part has a reflectance of 80% or more.

10. The backlight unit according to claim 3,
wherein the base substrate has a through hole.

11. The backlight unit according to claim 10,
wherein the optical sheet has a reflection part provided on a non-joining part for the light emitting device in a surface to which the plurality of light emitting devices are joined; and
wherein the through hole is provided in a position facing the reflection part.

12. The backlight unit according to claim 3,
wherein the base substrate has a peripheral member disposed around the light emitting device.

13. The backlight unit according to claim 12,
wherein the peripheral member has a cylindrical shape or a cup shape; and
wherein part of the joining layer is filled inside the peripheral member.

14. The backlight unit according to claim 1,
wherein the light emitting device includes the semiconductor light emitting element, and a light emission part which is exited by light from the semiconductor light emitting element to emit white light.

15. The backlight unit according to claim 1,
wherein the semiconductor light emitting element comprises a light emitting diode or a laser diode.

16. The backlight unit according to claim 1,
wherein the optical sheet has at least one selected from a optical diffusion film, a light guide plate, and a prism film.

17. A liquid crystal display device, comprising:
a backlight unit according to claim 1; and
a liquid crystal display part disposed on a light emission surface side of the backlight unit.

18. The liquid crystal display device according to claim 17,
wherein the backlight unit comprises a base substrate having the plurality of light emitting devices disposed thereon in matrix; and
wherein the base substrate is disposed directly under the liquid crystal display part.

19. The liquid crystal display device according to claim 17,
wherein the backlight unit has as the optical sheet at least one selected from a optical diffusion film and a prism film.

20. The liquid crystal display device according to claim 17, further comprising
at least one selected from a optical diffusion film and a prism film disposed between the optical sheet of the backlight unit and the liquid crystal display part.

* * * * *